United States Patent
Chen

(10) Patent No.: US 10,058,183 B2
(45) Date of Patent: Aug. 28, 2018

(54) HEADREST LIFTING MECHANISM

(71) Applicant: ATEC INTERNATIONAL TEAM CO., LTD., Taoyuan (TW)

(72) Inventor: Te-Chun Chen, Taoyuan (TW)

(73) Assignee: Atec International Team Co., Ltd., Luzhu Dist., Taoyuan (TW)

( * ) Notice: Subject to any disclaimer, the term of this patent is extended or adjusted under 35 U.S.C. 154(b) by 104 days.

(21) Appl. No.: 15/292,649

(22) Filed: Oct. 13, 2016

(65) Prior Publication Data

US 2018/0103765 A1  Apr. 19, 2018

(51) Int. Cl.
  *A47C 1/10* (2006.01)
  *A47C 7/38* (2006.01)
  *A47C 1/03* (2006.01)
  *A47C 7/40* (2006.01)
  *B60N 2/80* (2018.01)

(52) U.S. Cl.
  CPC ............... *A47C 7/383* (2013.01); *A47C 1/03* (2013.01); *A47C 7/402* (2013.01); *B60N 2/80* (2018.02)

(58) Field of Classification Search
  CPC ........... A47C 7/383; A47C 7/402; A47C 1/03; B60N 2/48; B60N 2/80
  USPC ................ 297/410, 411.36, 411.37, 353
  See application file for complete search history.

(56) References Cited

U.S. PATENT DOCUMENTS

| | | | |
|---|---|---|---|
| 6,209,961 B1* | 4/2001 | Chen | A47C 1/03 297/411.35 |
| 6,343,840 B1* | 2/2002 | Chuang | A47C 1/03 297/353 |
| 6,439,664 B1* | 8/2002 | Gorgi | A47C 1/03 297/353 |
| 6,709,059 B1* | 3/2004 | Cvek | A47C 7/402 297/353 |

\* cited by examiner

*Primary Examiner* — Syed A Islam
(74) *Attorney, Agent, or Firm* — Muncy, Geissler, Olds & Lowe, P.C.

(57) ABSTRACT

A headrest lifting mechanism is revealed. The headrest lifting mechanism is disposed on a seat back and including a lifting base, a bottom-side vertical support and an elastic positioning rod. A headrest is connected to an upper end of the bottom-side vertical support. A positioning end of the elastic positioning rod fixed on the bottom-side vertical support is moved downward into one of the slots of the lifting base owing to material elasticity when the bottom-side vertical support is assembled with the lifting base. Thus the bottom-side vertical support and the positioning end are slid and positioned together in the slots of the lifting base. The number of the parts is reduced and the assembly is simplified. This enables cost reduction and mass production.

5 Claims, 4 Drawing Sheets

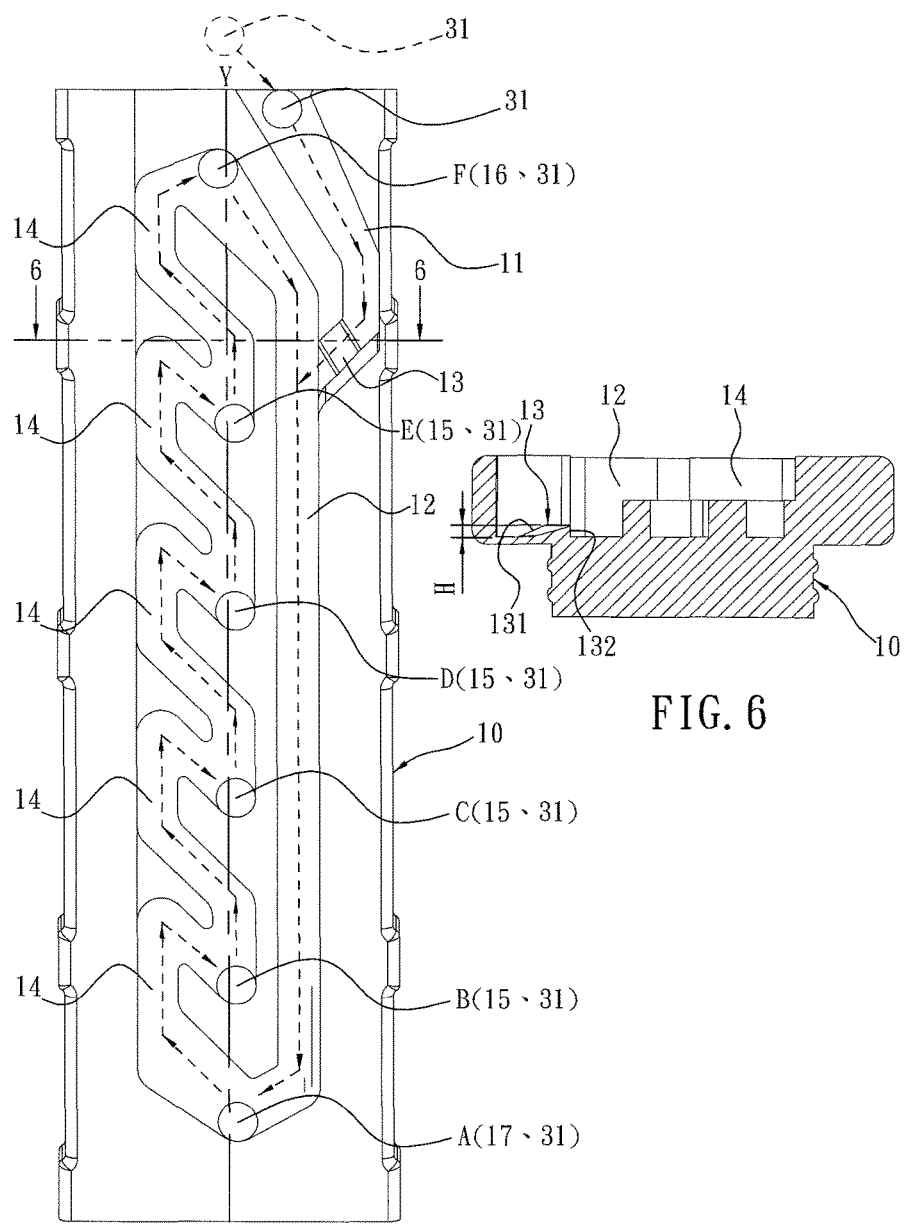

HEADREST LIFTING MECHANISM

BACKGROUND OF THE INVENTION

The present invention relates to a headrest lifting mechanism, especially to a headrest lifting mechanism assembled on a seat back while in use.

Now more chairs are designed to guarantee ergonomic comfort. There is a plurality of chairs with ergonomic design available now the market. Please refer to U.S. Pat. No. 6,709,059, an adjustable non-biased positioning mechanism is revealed. No biasing member is required to allow adjustment and maintenance of a position. A first member is provided with a channel forming locking positions and a return channel. A second member, slidably movable with respect to the first member, is provided to mount a rotatable cog. The cog interfaces with the channel of the first member to selectively inhibit relative movement between the first and the second members without use of a biasing member. However, the above prior art has complicated design and difficulty in assembly and operation. The increased cost has negative effect on the mass production. There is room for improvement and a need to provide a novel lifting mechanism for headrests of the chairs.

SUMMARY OF THE INVENTION

Therefore it is a primary object of the present invention to provide a headrest lifting mechanism assembled on a seat back while in use. The headrest lifting mechanism features on fewer parts and easy assembly of the parts. Thus the headrest lifting mechanism can be mass-produced and the production cost can be further reduced.

In order to achieve the above object, a headrest lifting mechanism according to the present invention includes a lifting base, a bottom-side vertical support and an elastic positioning rod.

The lifting base is moveably arranged at the seat back and including an inclined entry slot, a main straight slot, a curved guide slot and a plurality of stair-like slots. The inclined entry slot is located on one of the two sides of the lifting base divided by an axis of the lifting base, close to a top end of the lifting base and extended downward from the top end of the lifting base. The main straight slot is formed at the same side of the lifting base as the inclined entry slot and extended from an upper part to a lower part of the lifting base. The curved guide slot is disposed between a lower part of the inclined entry slot and an upper part of the main straight slot for communicating the inclined entry slot with the main straight slot. The plurality of stair-like slots is located at the other side of the lifting base, opposite to the side with the main straight slot, and is arranged in turn from the lower part to the upper part of the lifting base. Each stair-like slot has a stop point. An upper part of the uppermost stair-like slot is communicating with an upper part of the main straight slot so as to define a top point while a lower part of the lowermost stair-like slot is communicating with a lower part of the main straight slot so as to define a bottom point. A bottom-side vertical support is disposed with a headrest on an upper end thereof so that the headrest is slid upward/downward along with the bottom-side vertical support. The bottom-side vertical support further includes a straight slide rail that is moveably arranged at the lifting base. A top end of the elastic positioning rod is fixed on an axis of the straight slide rail of the bottom-side vertical support while a bottom end thereof forms a positioning end that is elastically located at the axis of the straight slide rail by material elasticity of the elastic positioning rod.

The positioning end of the elastic positioning rod is guided into the inclined entry slot of the lifting base by elasticity of the material thereof, then slid through the curved guide slot of the lifting base and moved into the main straight slot when the bottom-side vertical support is assembled with the lifting base.

The positioning end of the elastic positioning rod is slid along the main straight slot and stopped at the bottom point after being guided into the main straight slot of the lifting base.

The positioning end is moved away from the bottom point, slid along the lowermost stair-like slot and then stopped at the stop point of the lowermost stair-like slot so as to be at the lowest position when the bottom-side vertical support is pulled and the positioning end is moved upward along with the bottom-side vertical support.

The positioning end is slid from the stop point of the stair-like slot at the lower position to the stop point of the stair-like slot at the higher position for adjusting height of the bottom-side vertical support while the bottom-side vertical support still being pulled and the positioning end moved upward along with the bottom-side vertical support.

The positioning end is directly slid along the stair-like slot and the main straight slot and then stopped at the bottom point owing to material elasticity when the bottom-side vertical support is pulled and the positioning end is slid to the top point of the uppermost stair-like slot. Thereby the headrest can be adjusted again.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein:

FIG. 5 is a front view of the embodiment in FIG. 4 according to the present invention;

FIG. 6 is a partial cross sectional view of the embodiment in FIG. 5 according to the present invention.

DETAILED DESCRIPTION OF THE PREFERRED EMBODIMENT

Figure 1:
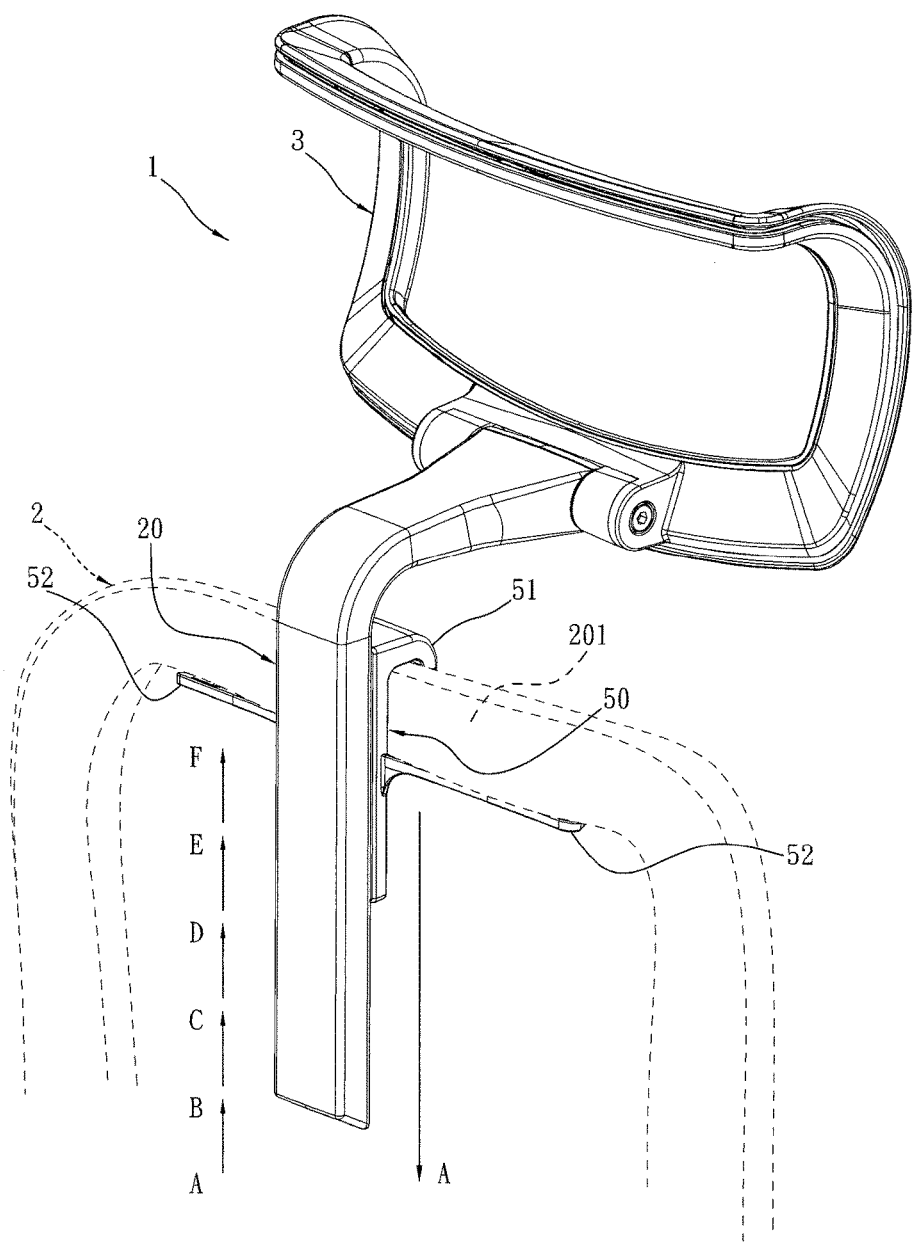
FIG. 1 is a schematic drawing showing a perspective view of an embodiment assembled on a chair according to the present invention.
Figure 2:
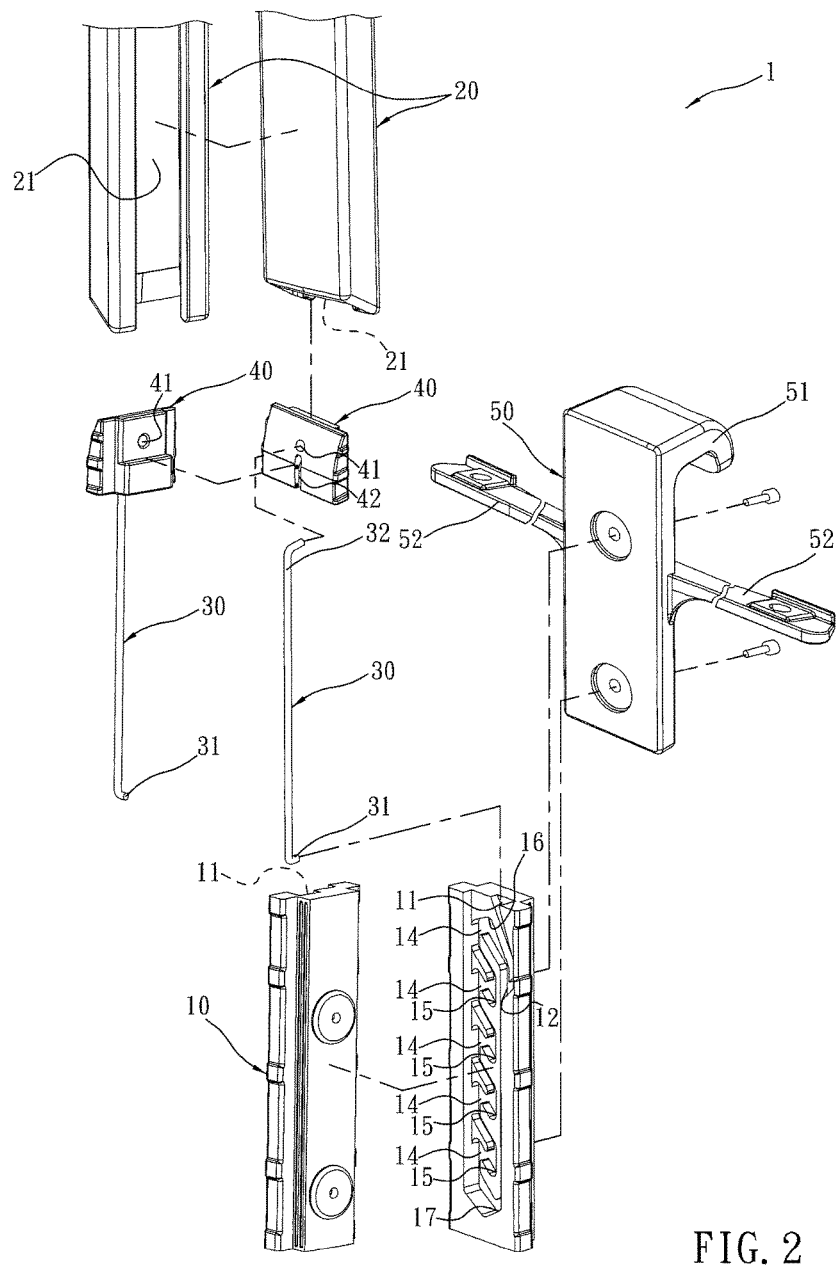
FIG. 2 is an explosive view of an embodiment according to the present invention.

Refer to FIG. 1 and FIG. 2, a headrest lifting mechanism 1 of the present invention is disposed on a seat back 2 while in use. The headrest lifting mechanism 1 includes a lifting base 10, a bottom-side vertical support 20 and an elastic positioning rod 30.

Figure 4:
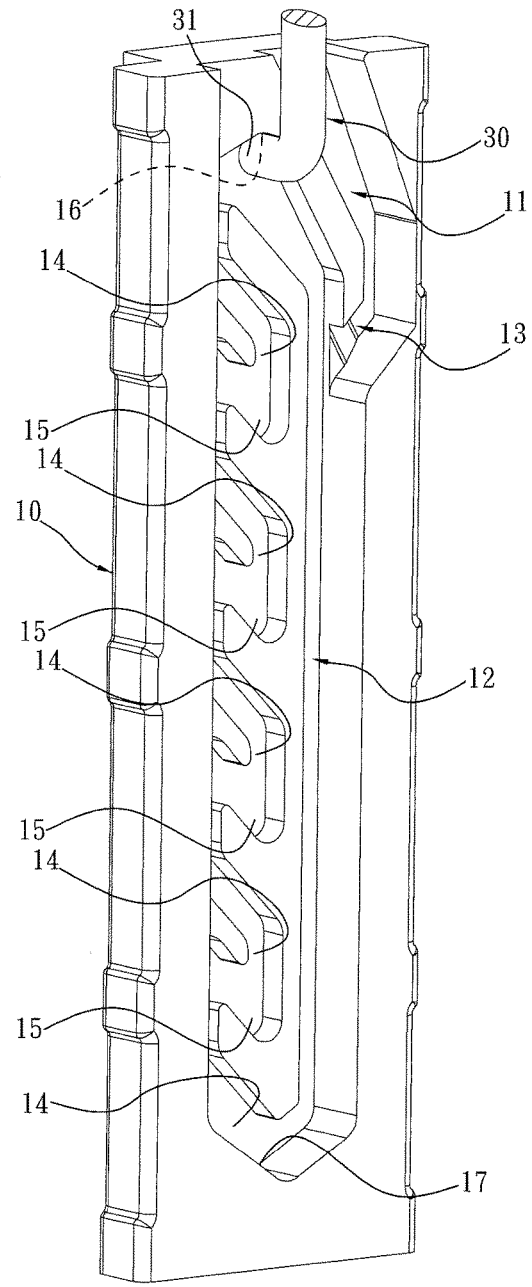
FIG. 4 is a perspective view of a lifting base assembled with an elastic positioning rod of an embodiment according to the present invention.

The lifting base 10 is moveably arranged at the seat back 2. As shown in FIG. 4 and FIG. 5, the lifting base 10 is disposed with a plurality of slots each of which has an inclined entry slot 11, a main straight slot 12, a curved guide slot 13 and a plurality of stair-like slots 14.

Figure 3:
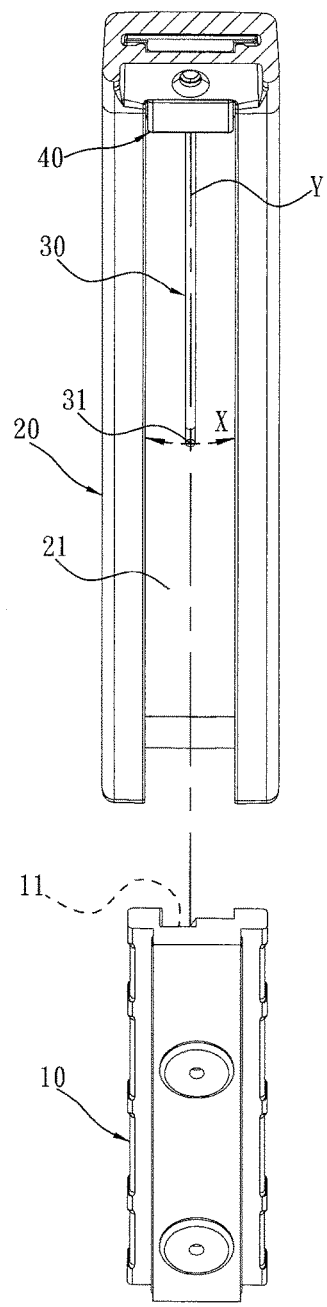
FIG. 3 is a schematic drawing showing a lifting base and a bottom-side vertical support of an embodiment according to the present invention.

Refer to FIG. 4 and FIG. 5, the lifting base 10 is divided into two sides by an axis thereof (as the Y axis in FIG. 3 and FIG. 5 indicates). The inclined entry slot 11 is located on one of the two sides of the lifting base 10, close to the top end of the lifting base 10 and extended downward from the top end of the lifting base 10. The main straight slot 12 is located at the same side of the lifting base 10 as the inclined entry slot 11 and extended from an upper part to a lower part of the lifting base 10. The curved guide slot 13 is arranged between a lower part of the inclined entry slot 11 and an upper part of the main straight slot 12 for communicating the inclined entry slot 11 with the main straight slot 12. Refer to FIG. 5 and FIG. 6, a down ramp 131 is formed on a part of the bottom surface of the curved guide slot 13 facing a bottom surface of the inclined entry slot 11 while a steep descent 132 is formed on other part of the bottom surface of the curved guide slot 13 facing the bottom surface of the main straight slot 12. There is a height difference between the steep descent 132 and the bottom surface of the main straight slot 12 (as the height H shown in FIG. 6 indicates). The plurality of stair-like slots 14 is located at the other side, opposite to the side with the main straight slot 12, and is arranged in turn from the lower part to the upper part of the lifting base 10. Each stair-like slot 14 includes a stop point 15. An upper part of the uppermost stair-like slot 14 is communicating with an, upper part of the main straight slot 12 so as to define a top point 16 while a lower part of the lowermost stair-like slot 14 is communicating with a lower part of the main straight slot 12 so as to define a bottom point 17.

The lifting base 10 is fastened with a positioning member 50 to form an integral part. The positioning member 50 includes a vertical locking rod 51 and a horizontal locking rod 52. The vertical locking rod 51 and the horizontal locking rod 52 are clipped on an upper part of a frame 201 of the seat back 2, able to be applied to the seat back 2 with different shapes.

A headrest 3 is connected to an upper end of the bottom-side vertical support 20 so that the headrest 3 is lifted and slid along with the bottom-side vertical support 20. The bottom-side vertical support 20 includes a straight slide rail 21 moveably disposed on the lifting base 10. The lifting mechanism 1 and the seat back 2 are integrated when the bottom-side vertical support 20 and the lifting base 10 are connected.

A top end of the elastic positioning rod 30 is fixed on an axis of the straight slide rail 21 of the bottom-side vertical support 20 (as the Y axis in FIG. 3 and FIG. 5 indicates) while a positioning end 31 is formed on a bottom end of the elastic positioning rod 30 and elastically located at the axis of the straight slide rail 21 by material elasticity of the elastic positioning rod 30. The positioning end 31 swings along the axis of the straight slide rail 21 (the Y axis shown in FIG. 3 and FIG. 5) owing to elasticity of the material for the positioning end 31, as the arrow X in FIG. 3 indicates.

The straight slide rail 21 of the bottom-side vertical support 20 is disposed with a stabilizing member 40 formed by a fixing hole 41 and a fixing slot 42. A top end of the elastic positioning rod 30 is mounted and fixed in the fixing hole 41 while a part of an upper part 32 of the elastic positioning rod 30 is mounted and fixed in the fixing slot 42. Thus the elastic positioning rod 30 is able to be maintained at the axis (as the Y axis in FIG. 3 and FIG. 5 indicates) of the lifting base 10 by elasticity of the material for the elastic positioning rod 30.

Refer from FIG. 2 to FIG. 5, the positioning end 31 of the elastic positioning rod 30 is moved away from the axis (as the Y axis in FIG. 3 and FIG. 5 indicates) and moved into the inclined entry slot 11 of the lifting base 10 by elasticity of the material thereof (as the arrow X in FIG. 3 indicates) when the bottom-side vertical support 20 is assembled with the lifting base 10. As shown in FIG. 5 and FIG. 6, the positioning end 31 is slid downward, turned back to the axis (as the Y axis in FIG. 3 and FIG. 5 indicates) by material elasticity, moved upward and downward along the down ramp 131 of the curved guide slot 13 and the steep descent 132, and then entered the main straight slot 12. The positioning end 31 is now on the bottom surface of the main straight slot 12 whose position is lower than the steep descent 132, unable to be easily turned back to the inclined entry slot 11 because of a height difference between the steep descent 132 and the bottom surface of the main straight slot 12, as the height H in FIG. 6 indicates.

Refer to FIG. 1, FIG. 4 and FIG. 5, the positioning end 31 of the elastic positioning rod 30 is slid along the main straight slot 12 and stopped at the bottom point 17 (as the position A in FIG. 1 and FIG. 5 indicates) after being guided into the main straight slot 12 of the lifting base 10.

The positioning end 31 is moved away from the bottom point 17 (as the position A in FIG. 1 and FIG. 5 indicates), moved along the lowermost stair-like slot 14 and then stopped at the stop point 15 (as the position B in FIG. 1 and FIG. 5 indicates) of the lowermost stair-like slot 14 so as to be at the lowest position when the bottom-side vertical support 20 is pulled and the positioning end 31 is moved upward along with the bottom-side vertical support 20.

According to the operation way mentioned above, the positioning end 31 is slid from the stop point 15 (the position B) of the lower stair-like slot 14 to the stop point 15 (the position C) of the higher stair-like slot 14. Or the positioning end 31 is moved away from the stop point 15 (the position C) of the higher stair-like slot 14 and then stopped at the stop point 15 (the position D) of the even higher stair-like slot 14. Or the positioning end 31 is slid from stop point 15 (the position D) of the even higher stair-like slot 14 to the stop point 15 (the position E) of the even more higher stair-like slot 14. Thus the height adjustment has been achieved by the above operation.

The positioning end 31 is directly slid along the stair-like slot 14 and the main straight slot 12 and then stopped at the bottom point 17 (as the position A in FIG. 1 and FIG. 5 indicates) owing to material elasticity when the bottom-side vertical support 20 is pulled and the positioning end 31 is slid from the stop point 15 (the position E) to the uppermost top point 16 (as the position F in FIG. 1 and FIG. 5 indicates). Thereby the height of the headrest 3 can be adjusted again.

Compared with techniques available now, the headrest lifting mechanism 1 of the present invention has the following advantages:

(1). The headrest lifting mechanism 1 of the present invention is mainly composed of the lifting base 10, the bottom-side vertical support 20 and the elastic positioning rod 30. The assembly is easier with the fewer parts and this is beneficial to cost reduction and mass production.

(2). The headrest lifting mechanism 1 of the present invention and the seat back 2 are assembled respectively. This is convenient for transportation.

(3). There is a height difference between the bottom surface of the curved guide slot 13 of the lifting base 10 and the steep descent 132, as the height H shown in FIG. 6 indicates. There is also a height difference between the steep descent and the bottom surface of the main straight slot. Thus the positioning end 31 is unable to be easily turned back to the inclined entry slot 11, or fallen off.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A lifting mechanism assembled on a seat back while in use comprising:

a lifting base moveably arranged at the seat back and having:
  an inclined entry slot that is located on one of the two sides of the lifting base divided by an axis of the lifting base, close to a top end of the lifting base and extended downward from the top end of the lifting base;
  a main straight slot located at the same side of the lifting base as the inclined entry slot and extended from an upper part to a lower part of the lifting base;
  a curved guide slot that is arranged between a lower part of the inclined entry slot and an upper part of the main straight slot for communicating the inclined entry slot with the main straight slot; and
  a plurality of stair slots that is located at the other side of the lifting base, opposite to the side with the main straight slot, and is arranged in turn from the lower part to the upper part of the lifting base;

a bottom-side vertical support that is disposed with a headrest on an upper end thereof for being moved therealong and having a straight slide rail moveably disposed on the lifting base; and an elastic positioning rod having a top end thereof fixed on an axis of the straight slide rail of the bottom-side vertical support and a positioning end that is formed on a bottom end thereof and elastically located at the axis of the straight slide rail by material elasticity of the elastic positioning rod;

wherein each of the stair slots includes a stop point; an upper part of the uppermost stair slot is communicating with an upper part of the main straight slot so as to define a top point while a lower part of the lowermost stair slot is communicating with a lower part of the main straight slot so as to define a bottom point;

wherein the positioning end of the elastic positioning rod is guided into the inclined entry slot of the lifting base by elasticity of the material thereof, then slid through the curved guide slot of the lifting base and moved into the main straight slot when the bottom-side vertical support is assembled with the lifting base;

wherein the positioning end of the elastic positioning rod is slid along the main straight slot and stopped at the bottom point after being guided into the main straight slot of the lifting base;

wherein positioning end is moved away from the bottom point, slid along the lowermost stair slot and then stopped at the stop point of the lowermost stair slot so as to be at the lowest position when the bottom-side vertical support is pulled and the positioning end is moved upward along with the bottom-side vertical support;

wherein the positioning end is slid from the stop point of one of the stair slots at a lower position to the stop point of one of the stair slots at a higher position for adjusting height of the bottom-side vertical support when the bottom-side vertical support is still pulled and the positioning end is moved upward along with the bottom-side vertical support;

wherein the positioning end is directly slid along the stair slot and the main straight slot and then stopped at the bottom point for next adjustment by material elasticity when the bottom-side vertical support is pulled and the positioning end is slid to the top point of the uppermost stair slot.

2. The device as claimed in claim 1, wherein a down ramp is formed on a part of a bottom surface of the curved guide slot facing a bottom surface of the inclined entry slot while a steep descent is formed on other part of the bottom surface of the curved guide slot facing a bottom surface of the main straight slot and there is a height difference between the steep descent and the bottom surface of the main straight slot.

3. The device as claimed in claim 1, wherein the straight slide rail of the bottom-side vertical support is arranged with a stabilizing member that includes a fixing hole and a fixing slot; a top end of the elastic positioning rod is mounted and fixed in the fixing hole while a part of an upper part of the elastic positioning rod is mounted and fixed in the fixing slot so that the elastic positioning rod is able to be maintained at the axis of the lifting base by material elasticity of the elastic positioning rod.

4. The device as claimed in claim 1, wherein the lifting base is fastened with a positioning member to form an integral part; the positioning member includes a vertical locking rod and a horizontal locking rod.

5. The device as claimed in claim 4, wherein the vertical locking rod and the horizontal locking rod are clipped on an upper part of a frame of the seat back.

* * * * *